US011934169B2

(12) United States Patent
Peterson et al.

(10) Patent No.: US 11,934,169 B2
(45) Date of Patent: Mar. 19, 2024

(54) CONFIGURABLE BINARY CIRCUITS FOR PROTECTION RELAYS IN ELECTRIC POWER SYSTEMS

(71) Applicant: Schweitzer Engineering Laboratories, Inc., Pullman, WA (US)

(72) Inventors: Brian James Peterson, Moscow, ID (US); Evan J. Penberthy, Moscow, ID (US); Greg Rzepka, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 465 days.

(21) Appl. No.: 17/308,152

(22) Filed: May 5, 2021

(65) Prior Publication Data

US 2022/0359142 A1    Nov. 10, 2022

(51) Int. Cl.
*G05B 19/042*    (2006.01)
*H02H 1/00*    (2006.01)
*H01H 47/00*    (2006.01)

(52) U.S. Cl.
CPC ....... *G05B 19/0425* (2013.01); *H02H 1/0092* (2013.01); *G05B 2219/1157* (2013.01); *G05B 2219/1182* (2013.01); *G05B 2219/21117* (2013.01); *G05B 2219/21127* (2013.01); *G05B 2219/21157* (2013.01); *G05B 2219/21159* (2013.01); *H01H 47/007* (2013.01); *H02H 1/0061* (2013.01)

(58) Field of Classification Search
CPC ........ G05B 19/0425; G05B 2219/1157; G05B 2219/1182; G05B 2219/21117; G05B 2219/21127; G05B 2219/21157; G05B 2219/21159; H02H 1/0092; H02H 1/0061; H01H 47/007

See application file for complete search history.

(56) References Cited

U.S. PATENT DOCUMENTS

| 3,671,827 | A | * | 6/1972 | Foley | ................... G05B 19/16 318/567 |
| 4,025,849 | A | | 5/1977 | Nihashi | |
| 4,197,471 | A | | 4/1980 | Lackey | |
| 4,417,099 | A | | 11/1983 | Pierce | |
| 4,420,784 | A | | 12/1983 | Chen | |

(Continued)

FOREIGN PATENT DOCUMENTS

| EP | 1981167 | 10/2008 |
| EP | 2770641 | 8/2014 |

OTHER PUBLICATIONS

TI Designs, "Digitally Isolated 2-Channel, Wide AC/DC Binary Input Module", Texas Instruments Inc., May 2015.

*Primary Examiner* — Henry Tsai
*Assistant Examiner* — John B Roche
(74) *Attorney, Agent, or Firm* — PCFB, LLC; Richard M. Edge

(57) ABSTRACT

Configurable binary circuits for use in electrical power systems may include an input/output port, a binary input subsystem for receiving a binary input signal, a binary output subsystem for transmitting a binary output signal, and a switch subsystem for selecting one of the binary input subsystem or the binary output subsystem for operation. Intelligent electronic devices (IEDs) and associated methods may include one or more configurable binary circuits.

17 Claims, 8 Drawing Sheets

(56) References Cited

U.S. PATENT DOCUMENTS

| | | | |
|---|---|---|---|
| 4,500,933 A | | 2/1985 | Chan |
| 4,562,547 A | | 12/1985 | Shauger |
| 4,618,906 A | | 10/1986 | Paice |
| 4,652,962 A | | 3/1987 | Howell |
| 4,658,320 A | | 4/1987 | Chester |
| 4,704,652 A | | 11/1987 | Billings |
| 4,740,966 A | | 4/1988 | Goad |
| 4,771,403 A | | 9/1988 | Maskovyak |
| 4,949,030 A | | 8/1990 | Tse |
| 5,398,025 A | | 3/1995 | Herman |
| 5,517,378 A | | 5/1996 | Asplund |
| 5,536,980 A | | 7/1996 | Kawate |
| 5,587,863 A | * | 12/1996 | Bergstrom ......... G05B 19/0425 361/103 |
| 5,652,688 A | | 7/1997 | Lee |
| 5,675,640 A | | 10/1997 | Tappert |
| 5,789,960 A | | 8/1998 | Bower |
| 6,189,324 B1 | * | 2/2001 | Williams ............... B64D 41/00 62/402 |
| 6,489,748 B1 | | 12/2002 | Okamura |
| 6,816,350 B1 | | 11/2004 | Hoopes |
| 6,820,160 B1 | | 11/2004 | Allman |
| 6,956,725 B2 | | 10/2005 | Boughton |
| 7,283,594 B1 | * | 10/2007 | Wood .................... H04L 5/1423 340/10.4 |
| 7,557,655 B2 | | 7/2009 | Minteer |
| 7,592,713 B2 | * | 9/2009 | Bryan ................ B60R 16/0315 307/9.1 |
| 7,728,749 B2 | | 6/2010 | Sahu |
| 7,746,877 B2 | | 6/2010 | Trethewey |
| 7,778,262 B2 | | 8/2010 | Beagley |
| 7,795,885 B2 | | 9/2010 | Gorczyca |
| 8,009,055 B2 | | 8/2011 | Lindsey |
| 8,276,006 B2 | | 9/2012 | Sawyers |
| 8,477,517 B2 | | 7/2013 | Joshi |
| 10,862,298 B2 | | 12/2020 | Peterson |
| 11,209,482 B1 | * | 12/2021 | Sharma ............ G01R 31/31703 |
| 2004/0217749 A1 | | 11/2004 | Orr |
| 2005/0152439 A1 | | 7/2005 | Beij |
| 2007/0120694 A1 | | 5/2007 | Lindsey |
| 2007/0127177 A1 | | 6/2007 | Benton |
| 2007/0239372 A1 | * | 10/2007 | Schweitzer ............. H02J 3/144 702/57 |
| 2008/0204274 A1 | | 8/2008 | Peters |
| 2009/0125124 A1 | | 5/2009 | Premerlani |
| 2010/0177830 A1 | | 7/2010 | Dreps |
| 2017/0026043 A1 | | 1/2017 | Lazaravich |
| 2018/0033954 A1 | * | 2/2018 | Aradhya ................. H01F 10/30 |
| 2020/0089183 A1 | * | 3/2020 | Kallikuppa .......... G05B 19/058 |

\* cited by examiner

CONFIGURABLE BINARY CIRCUITS FOR PROTECTION RELAYS IN ELECTRIC POWER SYSTEMS

TECHNICAL FIELD

The present disclosure relates to binary circuits for use with electric power systems, for example, in protection relays of the electric power systems. More specifically, but not exclusively, embodiments of this disclosure pertain to configurable binary circuits that may be configurable as binary input circuits and/or binary output circuits of protection relays for use in electric power transmission and distribution systems.

BRIEF DESCRIPTION OF THE DRAWINGS

This disclosure includes various non-limiting and non-exhaustive embodiments. For some embodiments, reference is made to certain illustrative embodiments that are depicted in the figures described below.

DETAILED DESCRIPTION

Figure 1:
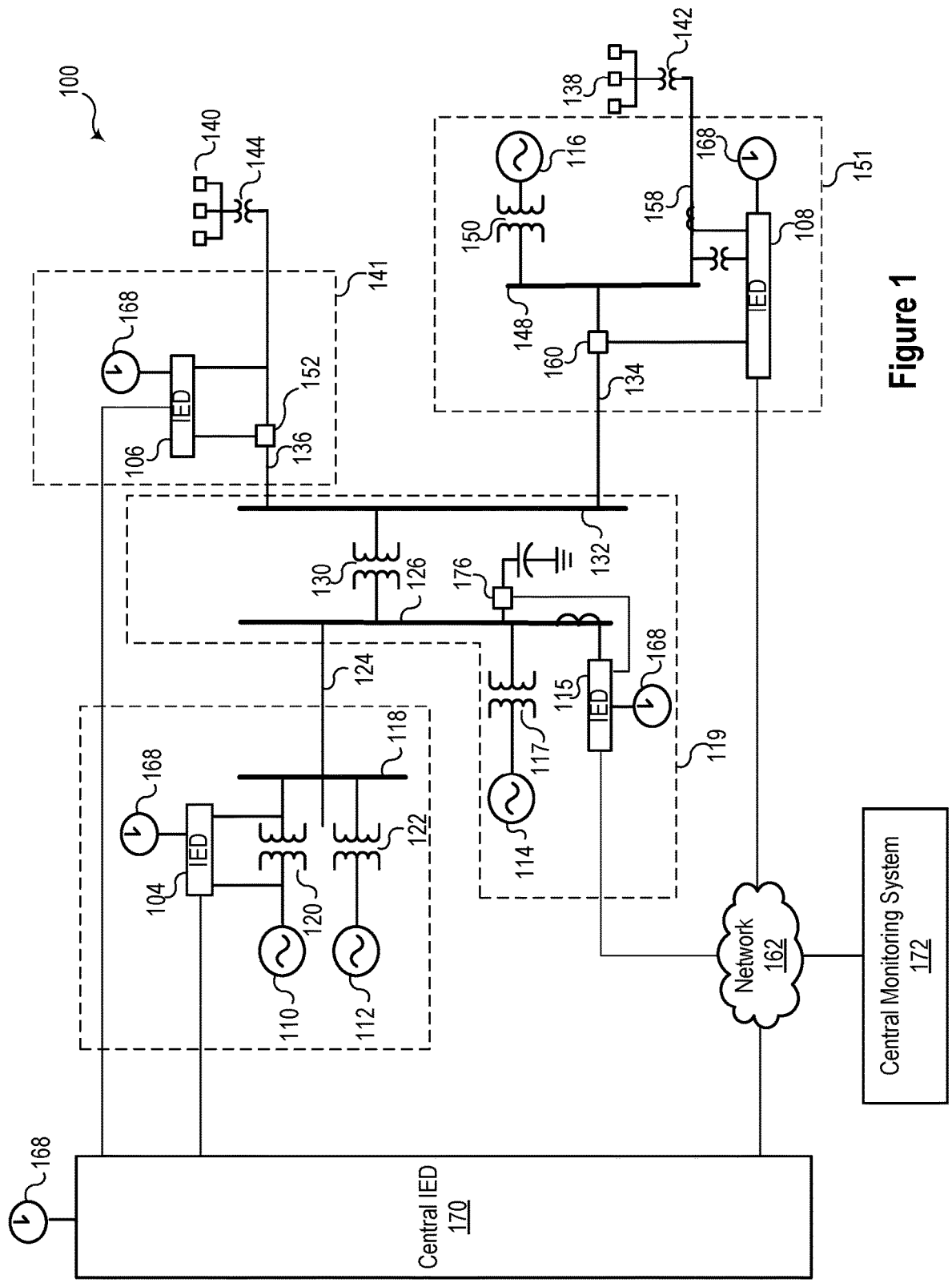
FIG. 1 illustrates an example of a simplified diagram of an electric power transmission and distribution system consistent with embodiments of the present disclosure.

Modern electric power systems incorporate a variety of technologies to monitor, protect and/or control distribution and transmission of electric power. Protective relays, monitoring equipment, motor protection relays, real-time automation controllers, and various other intelligent electronic devices (IEDs) may communicate with each other and/or receive information from various components within the electric power system. For example, protective relays may evaluate electrical conditions and implement control actions based on the evaluation.

According to various embodiments, an IED for protecting, monitoring, and/or controlling components within electric distribution and transmission systems may utilize binary circuits to monitor electric power systems and to output signals related to other components of the system. For example, the IED may utilize binary circuits to receive information (e.g., signals) provided via binary inputs and/or to output (e.g., transmit) signals to other components of the system. In additional embodiments, other types of IEDs may utilize such binary circuits as well.

However, while conventional protection devices utilize multiple binary circuits that are either binary inputs or binary outputs, embodiments of the present disclosure provide configurable binary circuits that combine a binary input and a binary output to create a single configurable binary input and/or output port. As discussed below, the binary circuit may be configured as a binary input, a binary output, or both a binary input and output. In some embodiments, where the configurable binary circuit is used as both a binary input and output, an outputted signal across the output terminals generated by the circuit acting as a binary output circuit may also be monitored with the binary input componentry.

With embodiments of the present disclosure, an IED (e.g., a protective relay, a feeder relay, etc.) would not be generally required to include separate dedicated binary input ports and binary output ports. Rather, such a protective relay may include configurable binary circuits having a binary input/output (I/O) port that may be configured in software and/or firmware to either be a binary input and/or a binary output. In some embodiments, such a configurable binary I/O port may be reconfigurable during operation of the protective relay (e.g., configured on the fly).

In some embodiments, the configurable binary input or binary output port may comprise a single channel universal binary input and binary output. The universal binary circuit may be capable of accepting and/or transmitting a wide range of voltage and is configurable for any voltage within a selected range (e.g., 0 to 300 volts, 24, 48, 110, 125, 220, 250 volts, etc.).

The binary circuit may be configured as one or more of a normally open circuit (e.g., a normally open switch), a normally closed circuit (e.g., a normally closed switch), a combination of an open and closed circuit (e.g., a circuit including one or more common leads with a normally open portion and a normally closed portion). In some embodiments, the binary circuit may be configured as a standard binary output (e.g., including an electromechanical relay only), a hybrid binary output (e.g., including both an electromechanical relay and a solid-state device), or a solid-state binary output. For example, the type of binary output of the configurable output may be selected from any suitable output configuration in accordance with embodiments of the disclosure and does not define or constrain the use of the configurable binary I/O port.

In some embodiments, binary inputs may monitor signals (e.g., voltage, current, impedance, etc.) across the terminals. For example, the binary inputs may be used to communicate information regarding the status of circuit breakers, reclosers, alarms, etc. For example, a circuit breaker may provide a 48-Vdc output to the configurable binary circuit (e.g., configured as an input circuit) of an IED to indicate that the circuit breaker is closed. As another example, an IED monitoring synchrophasors may indicate an alarm condition to a motor protection IED (e.g., with a configurable binary circuit operating as an output circuit) that is directed to a binary input port of the motor protection IED. As noted above, in some embodiments, the input components of the configurable binary circuit may be utilized to monitor such an output signal as it outputted from the IED.

In some embodiments, the IED may utilize the binary outputs to respond to a selected event and/or communicate with other components (e.g., other IEDs) of the system.

In some embodiments, when the configurable binary I/O port is configured as a binary output port, then the binary input circuitry can be used to monitor a signal (e.g., voltage and/or current) across the terminals of the binary output as it is transmitted from the binary circuit to another device.

In an example embodiment, an IED, such as a protective relay, includes a plurality of configurable binary circuits to receive various binary inputs from various other IEDs within a system or to output signals to those same devices Each binary circuit provides reinforced isolation of the DC or AC binary signals (e.g., voltages, currents, etc.) as the signals are transmitted to and from an IED controller via a protection subcircuit. The IED may include a variety of other inputs for monitoring various components of the electric power system and/or various control and/or protection outputs, including binary signal outputs.

In some embodiments, the binary input ports on an IED may receive and/or transmit AC or DC binary signals with voltage magnitudes between 0 Volts and 300 Volts. The binary input signals may allow for a relatively low current draw. In some embodiments, the amount of current draw may be configurable.

An IED (e.g., a protective relay) may include one or more binary circuits that each accommodate binary input between 0 and 300 Volts (AC or DC) and reduce power consumption at high voltages. In some embodiments, adaptations may be made to accommodate even higher voltages.

Embodiments of the present disclosure may provide a reduction in the number of binary I/O boards or circuits that are required to be installed in a protective relay platform as compared to a conventional IED. In conventional systems, if a different mix of binary I/O circuits is needed by a protective relay user, a different variant of the protective relay product will need to be assembled. However, a fully configurable binary I/O port will reduce the required number of I/O boards and, thereby, simplify ordering options for customers as well as simplify manufacturing assembly. Further, the user may be able to reduce the number of variants stocked for each relay.

The embodiments of the disclosure can be further understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps to be executed only once, unless otherwise specified.

In some cases, well-known features, structures, or operations are not shown or described in detail. For example, numerous rectification circuits and approaches for rectification are available and so are not described in detail herein. Furthermore, the described features, structures, or operations may be combined in any suitable manner in one or more embodiments. It is also appreciated that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic devices) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates an example of an embodiment of a simplified one-line diagram of an electric power transmission and distribution system 100 in which a plurality of communication devices may facilitate communication in a network (e.g., a software-defined network). The electric power delivery system 100 may be configured to generate, transmit, and distribute electric energy to loads. Electric power delivery systems may include equipment, such as electric generators (e.g., generators 110, 112, 114, 116), power transformers (e.g., transformers 117, 120, 122, 130, 142, 144, 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to a bus 126 through the step-up transformer 117. The bus 126 may be connected to a distribution bus 132 via a step-down transformer 130. Various distribution lines 136 and 134 may be connected to the distribution bus 132. The Distribution line 136 may lead to a substation 141 where the line is monitored and/or controlled using an intelligent electronic device (IED) 106, which may selectively open and close the breaker 152. A load 140 may be fed from the distribution line 136. Further step-down transformer 144 in communication with the distribution bus 132 via the distribution line 136 may be used to step down a voltage for consumption by the load 140.

The distribution line 134 may lead to a substation 151, and deliver electric power to the bus 148. The bus 148 may also receive electric power from the distributed generator 116 via the transformer 150. The distribution line 158 may deliver electric power from the bus 148 to the load 138, and may include further step-down transformer 142. A circuit breaker 160 may be used to selectively connect the bus 148 to the distribution line 134. An IED 108 may be used to monitor and/or control circuit breaker 160 as well as distribution line 158.

The electric power delivery system 100 may be monitored, controlled, automated, and/or protected using IEDs, such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within an electrical system. Such devices may include, for example, remote terminal units, differential relays, distance relays, directional relays, feeder relays, overcurrent relays, transformer relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout the system 100. Utilizing a common or universal time source may ensure that IEDs have a synchronized time signal that can be used to generate time-synchronized data, such as synchrophasors. In various embodiments, the IEDs 104, 106, 108, 115, and 170 may receive a common time signal 168. The time signal may be distributed in the system 100 using a communications network 162 or using a common time source, such as a Global Navigation Satellite System ("GNSS"), or the like.

According to various embodiments, a central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from the IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via a network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

Any of the various IEDs 104, 106, 108, and 115, breakers 152, 160, 176, generators 110, 112, 114, and 116, transformers 117, 120, 122, 130, 142, 144 and 150, and/or other devices and components of the system 100 may utilize DC binary inputs to make control, monitoring, and protection decisions. Accordingly, the presently described systems and methods for providing reinforced isolation of universal binary input voltages (e.g., 0 Vdc to 300 Vdc) with reduced power dissipation for high voltages may be implemented in conjunction with a wide variety of devices within an electric power delivery system. Thus, the examples of implementation within a protective relay are merely illustrative of one of the numerous possible implementations.

Figure 2:
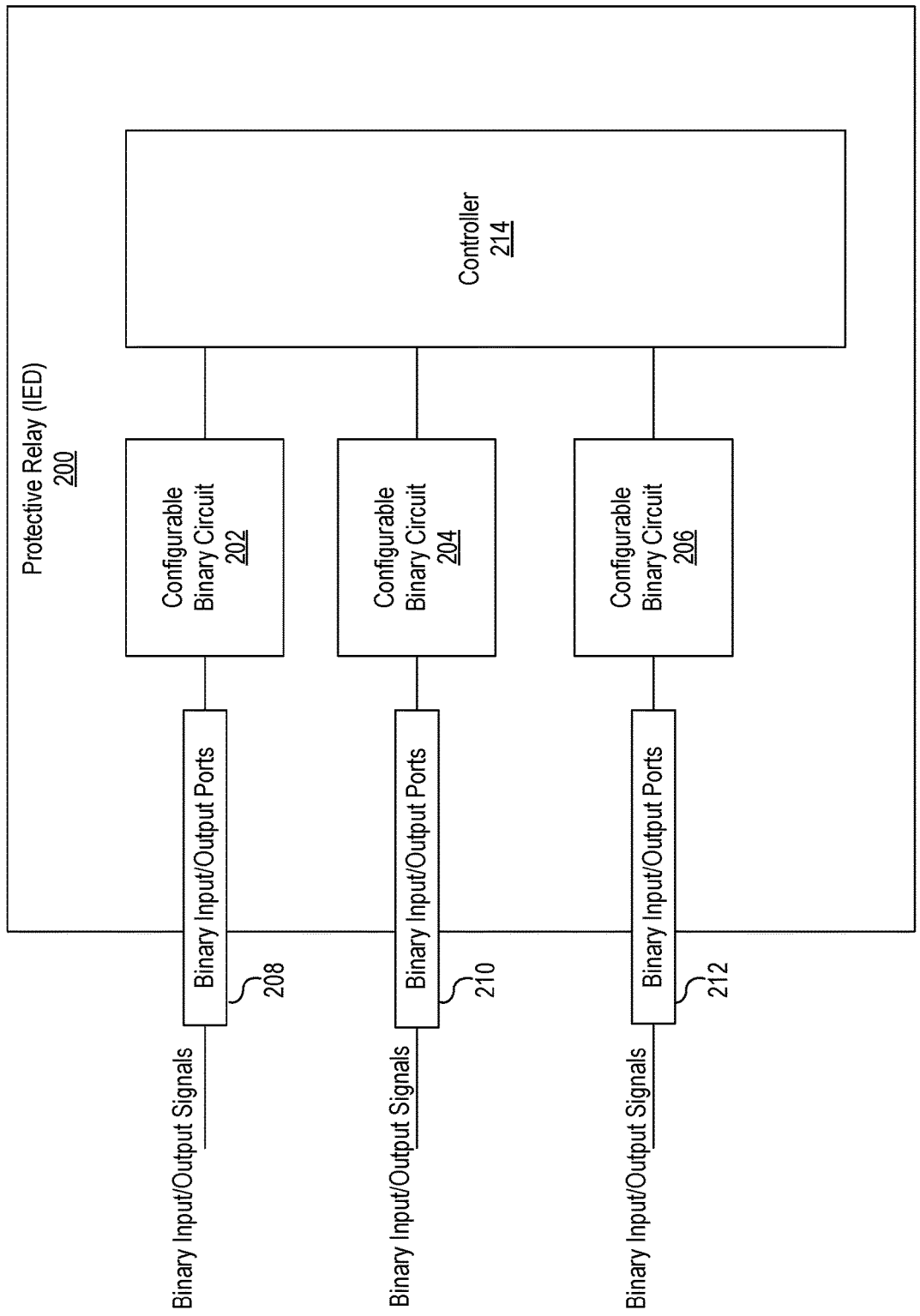
FIG. 2 illustrates an example of a simplified diagram of an intelligent electronic device (IED) with configurable binary circuits consistent with embodiments of the present disclosure.

FIG. 2 illustrates an example of an IED (e.g., simplified protective relay 200) with binary circuits 202, 204, and 206 electrically coupled to combined input/output ports 208, 210, and 212 (e.g., one circuit connected to a respective combined port). The binary circuits 202, 204, and 206 may be configured (e.g., via a software and/or firmware switch) to operate as a binary input circuit, a binary output circuit, or a combination of a binary input circuit and a binary output circuit. In additional embodiments, a hardware component may be utilized as a switch.

While three binary circuits are shown in FIG. 2, any number of configurable binary circuits may be used and may be used other nonconfigurable circuits.

As discussed below in greater detail, an IED may include a terminal block for the binary inputs that includes 2*N terminals, where N is the number of binary inputs/outputs. In such embodiments, each binary input/output is independently connected to the IED at two terminals (e.g., two polarity insensitive terminals). In additional embodiments, an IED may include a terminal block for the binary inputs/outputs that includes N+1 terminals, where N is again the number of binary inputs/outputs. In such embodiments, one wire of each binary input may be wired to a single common terminal (e.g., a common negative or ground).

The binary circuits 202, 204, and 206 may be selectively configured (e.g., for a given application) as various combinations of inputs, outputs, or a combination of inputs and outputs. For example, one or more of the binary circuits 202, 204, and 206 may be configured as binary input circuits to receive signals (e.g., voltage and/or current) from respective binary ports 208, 210, and 212, which are configured as inputs as desired. In some embodiments, the signals may be received at binary ports 208, 210, and 212 from devices such as circuit breakers, reclosers, alarm systems, and other protective relays. In some embodiments, these inputs may provide information such as, but not limited to, if a breaker is open, if a breaker is closed, if an alarm condition on a different protective relay has been met.

By way of further example, one or more of the binary circuits 202, 204, and 206 may be configured as binary output circuits to send signals (e.g., voltage and/or current) via respective binary ports 208, 210, and 212, which are configured as outputs as desired. In some embodiments, the signals may be sent via binary ports 208, 210, and 212 to respond to selected events (e.g., by sending commands based on the detection of a certain event) and/or to otherwise communicate with other components (e.g., other IEDs, such as those listed above) of the system.

The binary circuits 202, 204, and 206 that are configured or selected as input circuits may communicate the state of the binary input to a controller 214 to aid the protective relay 200 in making a protective decision. The protective relay 200 may respond and/or communicate via the binary circuits 202, 204, and 206 that are configured as binary inputs. In some embodiments, the controller 214 may include other outputs, such as multi-channel digital communication outputs and/or analog outputs. Such a response may include, but is not restrained to, tripping a circuit breaker; opening or closing a recloser; or providing an alarm signal to another protective relay. Protective relays may have any number of binary input circuits.

In some embodiments, protective relay 200 may include additional inputs, such as monitoring inputs, and/or various other complex components that are not described herein to avoid obscuring the presently described systems and methods. In the illustrated embodiment, the monitoring binary circuits 202, 204, and 206 may provide reinforced isolation of the binary inputs/outputs 208, 210, and 212 via input circuits (not shown) and isolation for providing electrically isolated communication with the controller 214.

In some embodiments, one or more of the binary circuits 202, 204, and 206 may be configured as both binary input and binary output circuits. For example, one or more of the binary circuits 202, 204, and 206 may be configured as binary output circuits to send signals via respective binary ports 208, 210, and 212. The binary circuits 202, 204, and 206 may also operate as a binary input circuit by monitoring the output signals being sent via the respective binary ports 208, 210, and 212. Such a configuration may be used to provide verification that a desired output signal has been sent from one or more of the binary circuits 202, 204, and 206.

Figure 3:
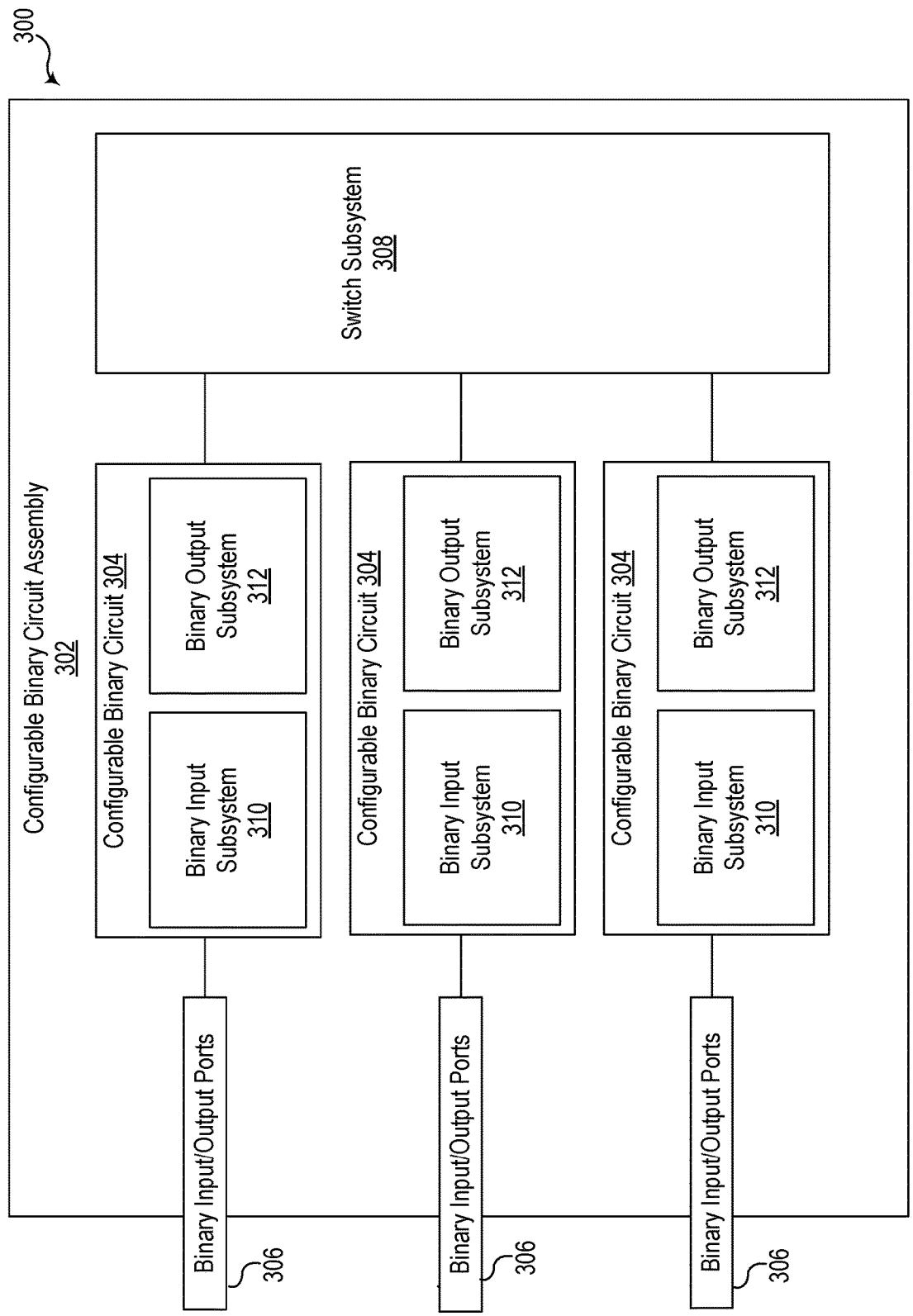
FIG. 3 illustrates a simplified representation of a protective intelligent electronic device (IED) including configurable binary circuits consistent with embodiments of the present disclosure.

FIG. 3 illustrates a simplified representation of a protective intelligent electronic device (IED) 300 (e.g., a protective relay) including a configurable binary circuit assembly 302 having one or more configurable binary circuits 304. As depicted, the configurable binary circuits 304 may be electrically coupled to combined input/output ports 306. While the various subsystems shown in FIG. 3 are depicted as being part of the configurable binary circuit assembly 302 or part of the overall IED 300, in some embodiments, such subsystems may be part of the individual configurable binary circuits 304 or entirely separate subsystems.

The configurable binary circuit assembly 302 includes one or more switches (e.g., switch subsystem 308) for configuring the configurable binary circuits 304. Each of the configurable binary circuits 304 may include a binary input subsystem 310 for receiving and/or monitoring a binary input signal and a binary output subsystem 312 for transmitting a binary output signal. The binary input subsystem 310 and the binary output subsystem 312 may be connected to the combined input/output ports 306 for routing the input and/or output signals.

As discussed above, the switch subsystem 308 may be used to configure (e.g., set) the configurable binary circuits 304 to operate as a binary input circuit using the binary input subsystem 310, a binary output circuit using the binary output subsystem 312, or a combination of a binary input circuit and a binary output circuit using both the binary input subsystem 310 and the binary output subsystem 312. Depending on the configuration set by the switch subsystem 308, the corresponding combined input/output ports 306 will also be configured to either direct signals into and/or out of the respective configurable binary circuits 304.

Figure 4:
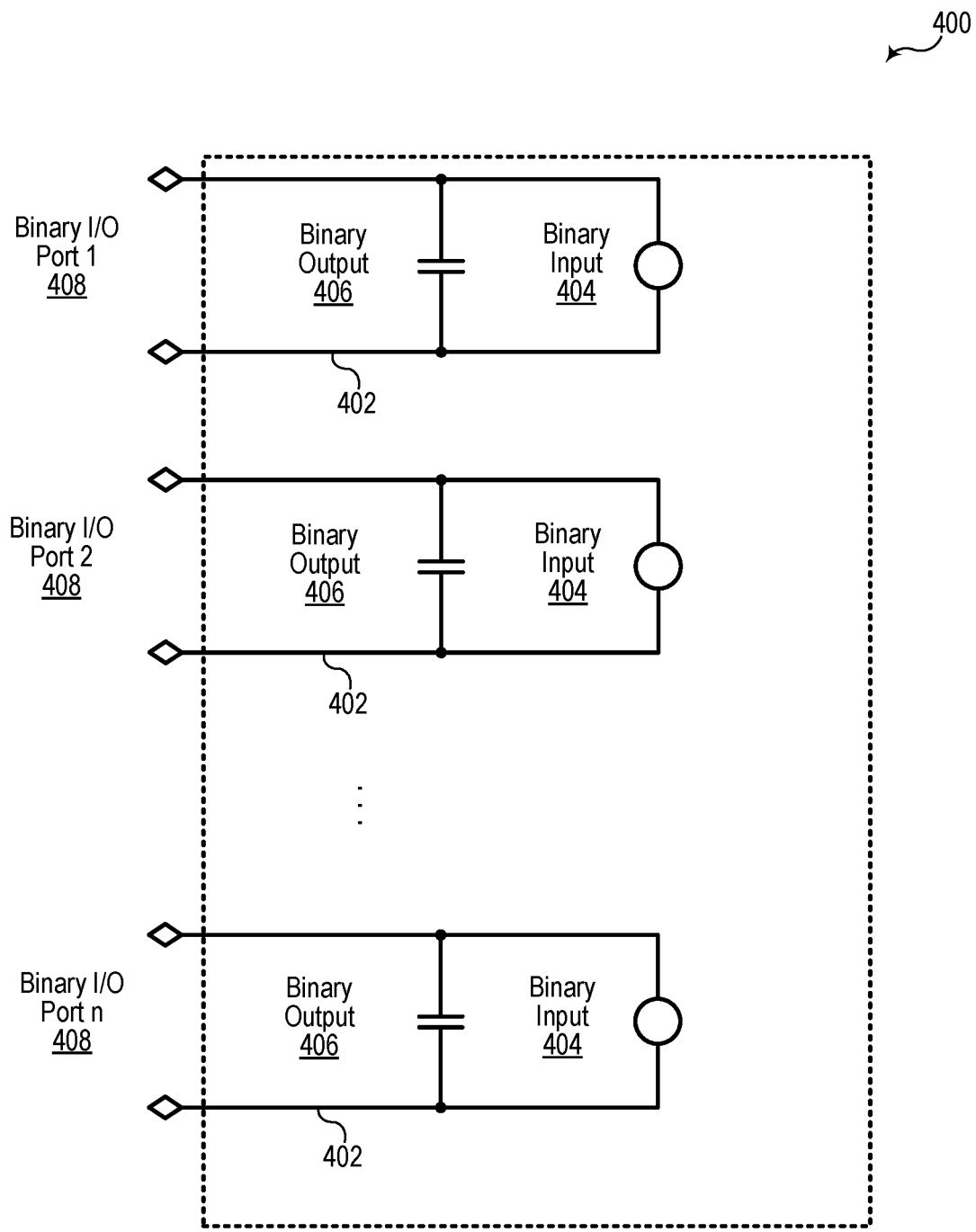
FIGS. 4 through 8 each illustrate a simplified representation of one or more configurable binary circuits consistent with various embodiments of the present disclosure.

FIG. 4 illustrates a simplified representation of one or more configurable binary circuits 402 (e.g., 1 to n number of circuits) in a configurable binary circuit assembly or IED 400. As depicted, each configurable binary circuit 402 may include a binary input 404 and a binary output 406 that may be independently selected (e.g., by the IED 400 and/or by a switch subsystem 308 as shown in FIG. 3). Each configurable binary circuit 402 may include corresponding combined input/output ports 408.

As discussed above, configurable binary circuit 402 may be configured to use the binary input 404, the binary output 406, or both the binary input 404 and the binary output 406. For example, where the binary output 406 is selected for use such that the configurable binary circuit 402 operates as a binary output, the binary input 404 may also be used to monitor an outputted signal at the configured output ports 408.

Each of the configurable binary circuits discussed below with reference to FIG. 5 through FIG. 8 may operate in a similar manner as configurable binary circuit discussed above, in some embodiments.

As indicated in FIG. 4, one or more of the configurable binary circuits 402 may be normally open circuits. For example, the configurable binary circuits 402 may operate as an open switch where signals are not flowing through the circuits 402 (e.g., not energized). In operation, the IED 400 or portion thereof (e.g., a controller) may close the circuit 402 when signals are to be passed through (e.g., transmitted from and/or received by) the circuit 402. For example, the IED 400 may alter the circuit from a default open state to a closed state, thereby energizing the circuit 402.

Figure 5:
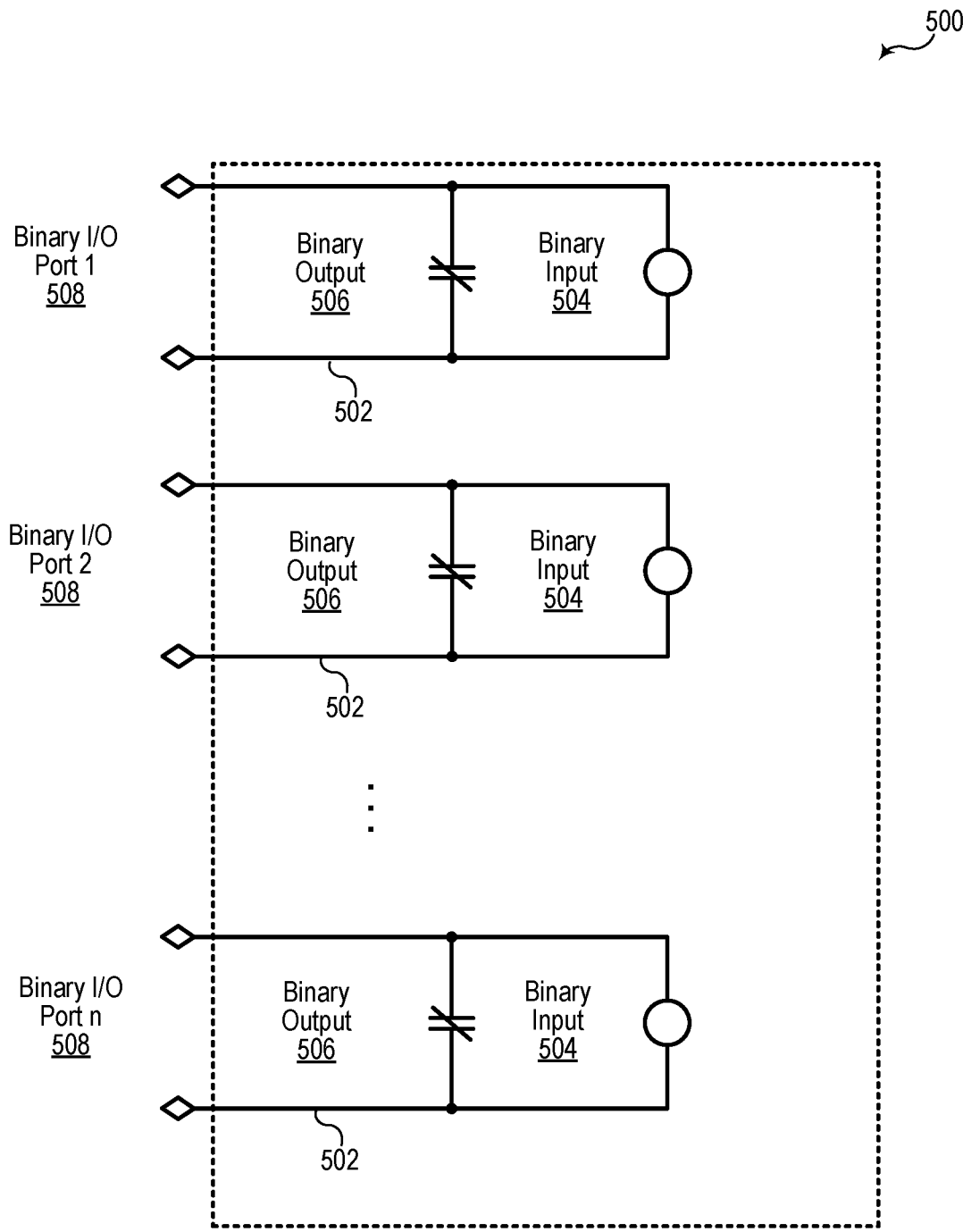

FIG. 5 illustrates a simplified representation of one or more configurable binary circuits 502 (e.g., 1 to n number of circuits) in a configurable binary circuit assembly or IED 500. As depicted, each configurable binary circuit 502 may include a binary input 504 and a binary output 506 that may be independently selected as discussed above. Each configurable binary circuit 502 may include corresponding combined input/output ports 508.

As indicated in FIG. 5, one or more of the configurable binary circuits 502 may be normally closed circuits. For example, the configurable binary circuits 502 may operate as a closed switch where signals may flow through circuits 502 (e.g., energizing the circuit). In operation, the IED 500 or portion thereof (e.g., a controller) may open the circuit 502 when signals are no longer to be passed through (e.g., transmitted from and/or received by) the circuit 502. For example, the IED 500 may alter the circuit from a default closed state to a open state, thereby not energizing the circuit 502.

Figure 6:
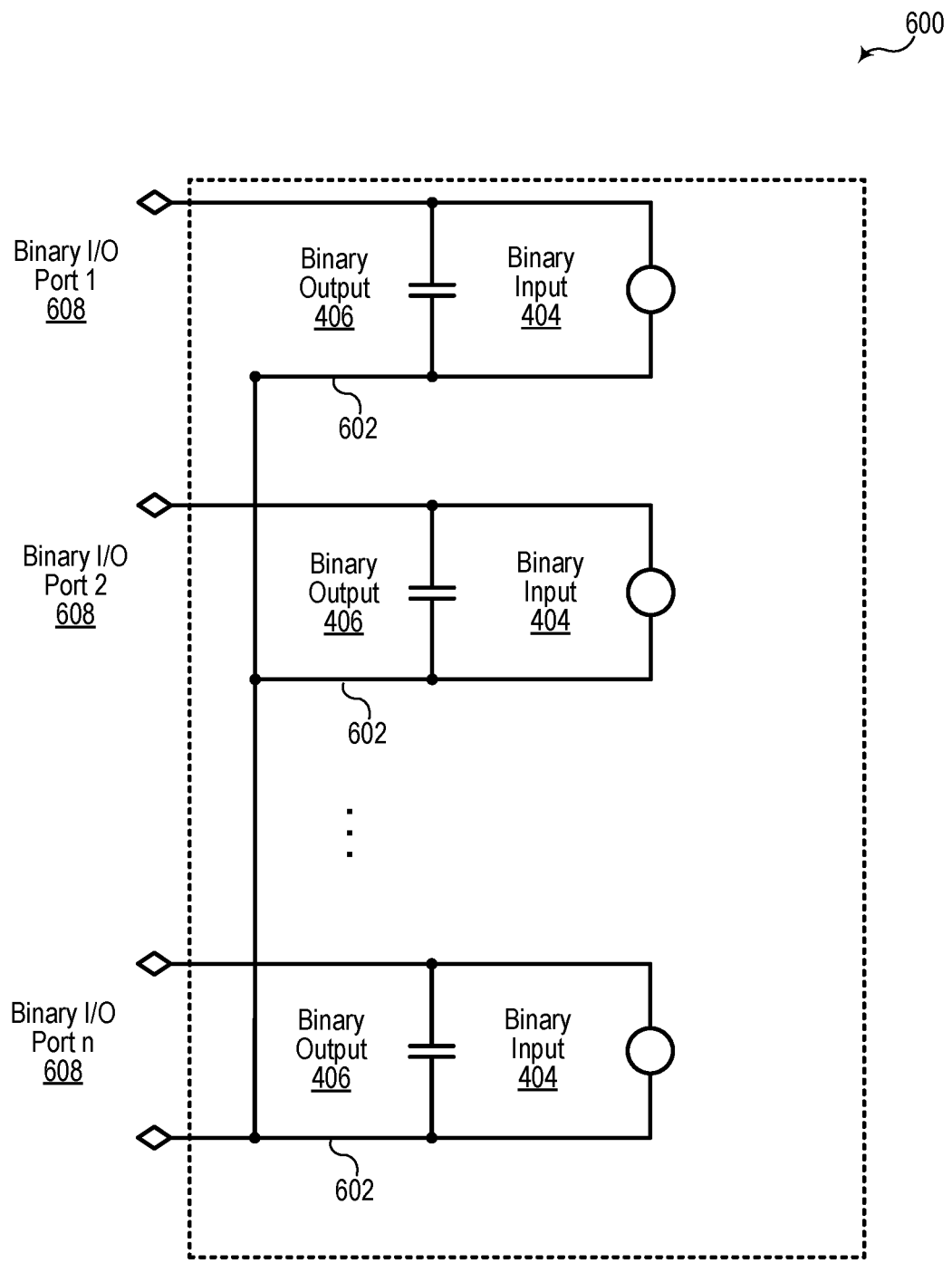

FIG. 6 illustrates a simplified representation of one or more configurable binary circuits 602 (e.g., 1 to n number of circuits) in a configurable binary circuit assembly or IED 600. As depicted, each configurable binary circuit 602 may be similar to the normally open configuration shown in FIG. 4. However, combined input/output ports 608 may include a common terminal. For example, the combined input/output ports 608 of each of the configurable binary circuits 602 may include a common negative or ground.

Figure 7:
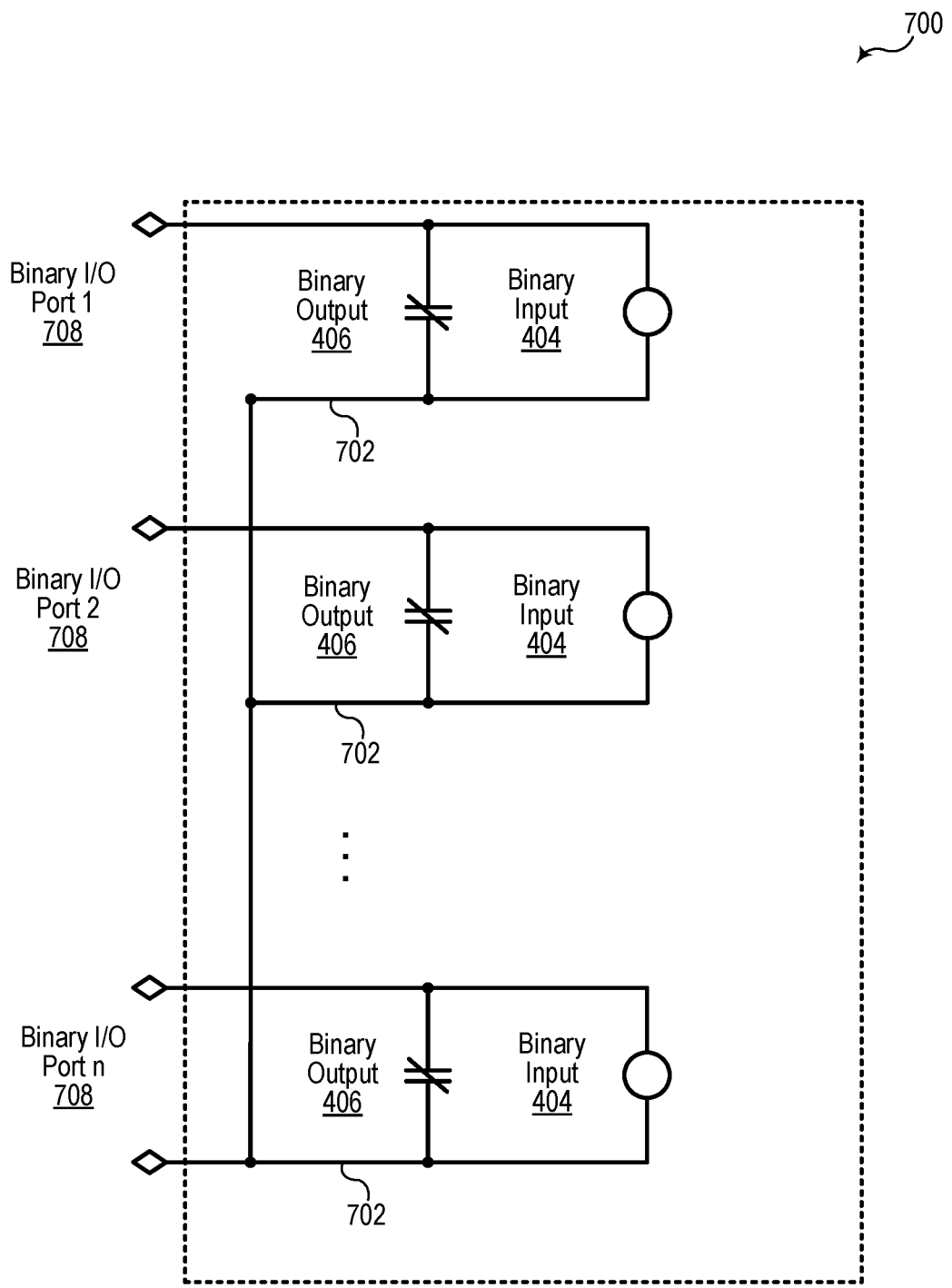

FIG. 7 illustrates a simplified representation of one or more configurable binary circuits 702 (e.g., 1 to n number of circuits) in a configurable binary circuit assembly or IED 700. As depicted, each configurable binary circuit 702 may be similar to the normally closed configuration shown in FIG. 5. However, combined input/output ports 708 may include a common terminal. For example, the combined input/output ports 708 of each of the configurable binary circuits 702 may include a common negative or ground.

Figure 8:
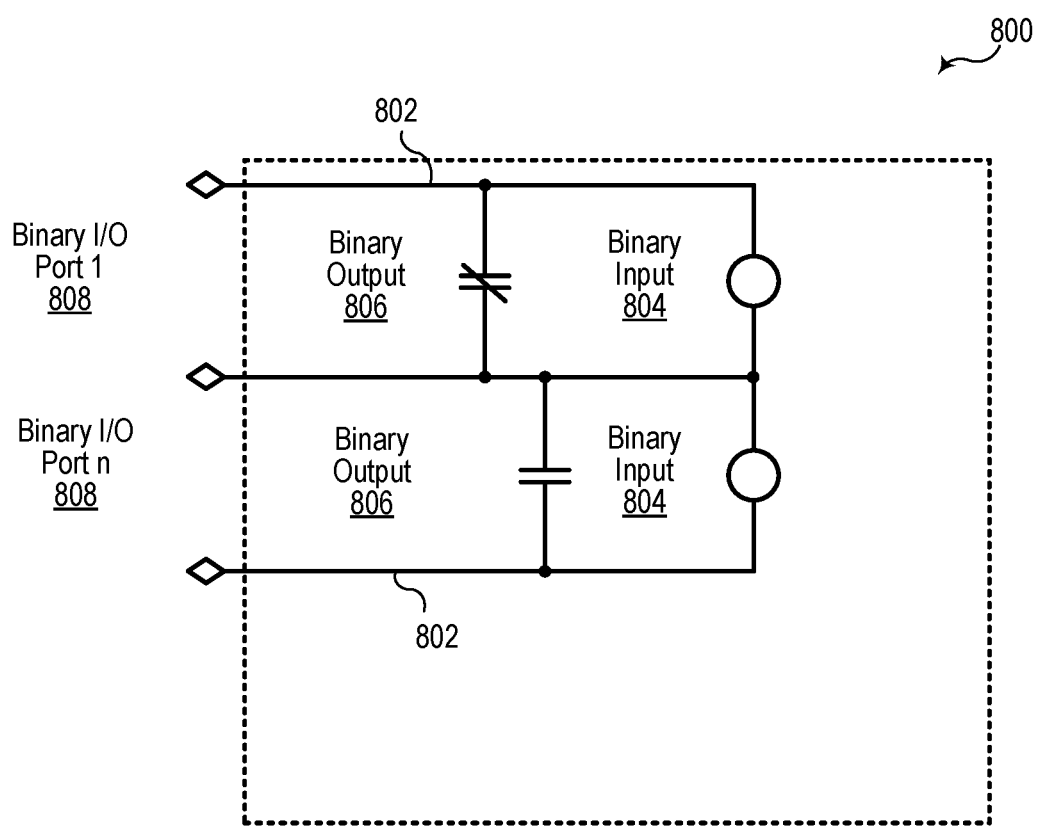

FIG. 8 illustrates a simplified representation of one or more configurable binary circuits 802 (e.g., 1 to n number of circuits) in a configurable binary circuit assembly or IED 800. As depicted, each configurable binary circuit 802 may include a binary input 804 and a binary output 806 that may be independently selected as discussed above. Each configurable binary circuit 802 may include corresponding combined input/output ports 808. As depicted, adjacent configurable binary circuit 802 may share a common terminal.

As indicated in FIG. 8, one or more of the configurable binary circuits 802 may include both normally closed circuits and normally open circuits. For example, each set (e.g., two) of the configurable binary circuits 802 may have one or more common leads (e.g., three leads with one lead being common) where one configurable binary circuit 802 is normally open and another, adjacent configurable binary circuits 802 is normally closed. In such an embodiment, variations of energizing and not energizing the configurable binary circuits 802 may be used to provide signals from and/or to the IED 800.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined to encompass the following claims.

What is claimed is:

1. A configurable binary circuit for use in an electrical power system, comprising:
    an input/output port to at least one of receive a binary signal input as an input port or transmit a binary signal output as an output port;
    a binary input subsystem for receiving the binary signal input via the input/output port operating as the input port;
    a binary output subsystem for transmitting the binary signal output via the input/output port operating as the output port;
    a switch subsystem for selecting one of the binary input subsystem or the binary output subsystem for operation such that the configurable binary circuit operates as either a binary input circuit when the binary input subsystem is selected or a binary output circuit when the binary output subsystem is selected; and
    another configurable binary circuit with another input/output port;
    wherein one lead of the input/output port comprises a common terminal with a lead of the another input/output port of the another configurable binary circuit.

2. The configurable binary circuit of claim 1, wherein, when the configurable binary circuit operates as the binary output circuit when the binary output subsystem is selected by the switch subsystem, the binary input subsystem is programmed to monitor the output port for outgoing signals to verify that the binary output subsystem is transmitting an expected signal.

3. The configurable binary circuit of claim 1, wherein the configurable binary circuit comprises a normally open circuit.

4. The configurable binary circuit of claim 1, wherein the configurable binary circuit comprises a normally closed circuit.

5. The configurable binary circuit of claim 1, wherein both the configurable binary circuit and the another configurable binary circuit comprise a normally open circuit or both the configurable binary circuit and the another configurable binary circuit comprise a normally closed circuit.

6. The configurable binary circuit of claim 1, wherein the configurable binary circuit comprises a normally open circuit and the another configurable binary circuit comprises a normally closed circuit.

7. The configurable binary circuit of claim 1, wherein the binary output subsystem comprises at least one of an electromechanical relay or a solid-state binary output.

8. The configurable binary circuit of claim 1, wherein the input/output port is to receive and/or transmit a signal having a voltage magnitude between 0 volts and 300 volts.

9. An intelligent electronic device (IED) of an electric power system, comprising:
    configurable binary circuits, each configurable binary circuit comprising:
        an input/output port to at least one of receive an input signal as an input port or transmit an output signal as an output port;
        a binary input subsystem for receiving the input signal via the input/output port operating as the input port;
        a binary output subsystem for transmitting the output signal via the input/output port operating as the output port; and
        a switch subsystem for selecting the binary input subsystem or the binary output subsystem for operation such that the configurable binary circuit operates as either a binary input circuit when the binary input subsystem is selected or a binary output circuit when the binary output subsystem is selected; and
    one or more controllers in communication with and for operating the binary input subsystem of each of the configurable binary circuits and the binary output subsystem of each of the configurable binary circuits;
    wherein the binary input subsystem of at least one of the configurable binary circuits that is selected as the binary output circuit is programmed to monitor the output port for outgoing signals to verify that the binary output subsystem is transmitting an expected signal.

10. The IED of claim 9, wherein the one or more controllers are programmed to select one of the binary input subsystem or the binary output subsystem for operation with the switch subsystem.

11. The IED of claim 9, wherein the one or more controllers are programmed to provide instructions to the configurable binary circuits that are selected as the binary output circuit to transmit the output signal.

12. The IED of claim 9, wherein the one or more controllers are programmed to receive signals from the configurable binary circuits that are selected as binary input circuits.

13. The IED of claim 12, wherein the one or more controllers are programmed to provide instructions to the configurable binary circuits that are selected as the binary output circuit to transmit the output signal based on the signals received from the configurable binary circuits that are selected as the binary input circuits.

14. The IED of claim 9, wherein the IED comprises a protective relay for providing at least one protective action to a component of the electric power system using at least one of the configurable binary circuits.

15. A configurable binary circuit for use in an electrical power system, comprising:
    an input/output port to at least one of receive a binary signal input as an input port or transmit a binary signal output as an output port;
    a binary input subsystem for receiving the binary signal input via the input/output port operating as the input port;

a binary output subsystem for transmitting the binary signal output via the input/output port operating as the output port;

a switch subsystem for selecting one of the binary input subsystem or the binary output subsystem for operation such that the configurable binary circuit operates as either a binary input circuit when the binary input subsystem is selected or a binary output circuit when the binary output subsystem is selected;

wherein, when the configurable binary circuit operates as the binary output circuit when the binary output subsystem is selected by the switch subsystem, the binary input subsystem is programmed to monitor the output port for outgoing signals to verify that the binary output subsystem is transmitting an expected signal.

16. The configurable binary circuit of claim 15, wherein the configurable binary circuit comprises another configurable binary circuit with another input/output port.

17. The configurable binary circuit of claim 16, wherein one lead of the input/output port comprises a common terminal with a lead of the another input/output port of the another configurable binary circuit.

\* \* \* \* \*